United States Patent
Hall

(10) Patent No.: US 10,521,678 B2
(45) Date of Patent: Dec. 31, 2019

(54) VISION SYSTEM AND METHOD FOR A MOTOR VEHICLE

(71) Applicant: VEONEER SWEDEN AB, Vargarda (SE)

(72) Inventor: Peter Hall, Linköping (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/754,606

(22) PCT Filed: Aug. 25, 2016

(86) PCT No.: PCT/EP2016/070102
§ 371 (c)(1),
(2) Date: Feb. 23, 2018

(87) PCT Pub. No.: WO2017/036919
PCT Pub. Date: Mar. 9, 2017

(65) Prior Publication Data
US 2018/0253610 A1    Sep. 6, 2018

(30) Foreign Application Priority Data
Aug. 28, 2015   (EP) .................................... 15183040

(51) Int. Cl.
*G06K 9/00* (2006.01)
*G06T 7/70* (2017.01)

(52) U.S. Cl.
CPC ..... *G06K 9/00805* (2013.01); *G06K 9/00369* (2013.01); *G06K 9/00825* (2013.01); *G06T 7/70* (2017.01); *G06T 2207/30196* (2013.01); *G06T 2207/30236* (2013.01); *G06T 2207/30261* (2013.01)

(58) Field of Classification Search
None
See application file for complete search history.

(56) References Cited

U.S. PATENT DOCUMENTS

2016/0288707 A1* 10/2016 Matsumura .............. B60Q 9/00
2016/0291145 A1* 10/2016 Zeng ..................... G01S 13/723
2018/0253610 A1*  9/2018 Hall .................. G06K 9/00805

FOREIGN PATENT DOCUMENTS

EP        1 355 285 A1    10/2003
WO    WO 2008/057042 A1    5/2008

OTHER PUBLICATIONS

A Fast Bicycle Detector Based on a Geometric Model for Single Side-view Image. Young et al. Jul. 2016.*
Overtaking vehicles detection and localization for driver assistance. Lin et al. Mar. 2014.*
International Search Report and Written Opinion of PCT/EP2016/070102, dated Jan. 25, 2017.

* cited by examiner

*Primary Examiner* — Delomia L Gilliard
(74) *Attorney, Agent, or Firm* — Brinks Gilson & Lione

(57) ABSTRACT

A vision system (10) for a motor vehicle including an imaging system (11) adapted to capture images from a surrounding of the motor vehicle and a data processing device (14) establishing an object detector (15) adapted to detect an object in images captured by the imaging system (11) through image processing. The object detector (15) includes a wheel detector (20) adapted to detect a wheel (22; 27), a wheel-like structure, or a characteristic part thereof, of another vehicle.

12 Claims, 3 Drawing Sheets

VISION SYSTEM AND METHOD FOR A MOTOR VEHICLE

CROSS-REFERENCE TO RELATED APPLICATIONS

This application is a 35 U.S.C. § 371 national phase application of PCT International Application No. PCT/EP2016/070102, filed Aug. 25, 2016, which claims the benefit of priority under 35 U.S.C. § 119 to European Patent Application No. 15183040.3, filed Aug. 28, 2015, the contents of which are incorporated herein by reference in their entirety.

FIELD OF THE INVENTION

The invention relates to a vision system for a motor vehicle, including an imaging system adapted to capture images from a surrounding of the motor vehicle and a data processing device establishing an object detector adapted to detect an object in images captured by the imaging system through image processing. Furthermore, the invention relates to a vision method for a motor vehicle.

BACKGROUND

A vision system of the above-described in general kind is known for example from WO 2008 057042 A1. Such vision systems are usually adapted to detect pedestrians, bicycles, large animals and/or other vehicles, in particular in order to avoid collisions with these objects.

The problem underlying the present invention is to provide a vision system and method for a motor vehicle with improved performance, in particular in a potential crossing scenario with another vehicle.

SUMMARY

An embodiment of the invention solves the above problem with the features described herein. The invention uses a wheel detector to detect a wheel, a wheel-like structure, or a characteristic part thereof, of another vehicle from the captured images. Here, the wheel is detected by itself, i.e. in an isolated manner, in comparison to detecting the complete vehicle. Generally, the wheel detector of the invention provides additional information about objects having wheels, namely other vehicles, which can improve the detection accuracy and reliability as well as collision avoidance. In particular, the wheel detector allows to determine the exact size and position of the wheel individually and independent of the size and position of the rest of the vehicle, which is usually not possible if the other vehicle is determined only as a whole. The exact size and position of the wheels of another vehicle provide valuable additional information, as will be explained in more detail in the following.

Preferably the wheel detector is combined with a non-wheel detector adapted to detect and/or classify a non-wheel part of the other vehicle, in order to obtain additional information. The non-wheel detector may for example be a pedestrian or bicyclist detector, or an object segmenter, as will be explained in the following. Preferably, the search area for the wheel detector is limited to a neighborhood of a detected non-wheel part, or the search area for the non-wheel detector is limited to a neighborhood of a detected wheel. In this manner, the corresponding search area does not have to be the complete image, but can be significantly smaller, which may save processing resources and can lead to faster object detection.

In a preferred embodiment of the invention, the other vehicle is a bicycle, i.e. the invention is for bicycle detection and/or classification. In order to detect and/or classify bicyclists, in particular when using a monocular camera, there is a need, especially in crossing scenarios, to track the whole bicycle including the wheels, preferably also the frame. For example, to mitigate injuries for bicycles using Autonomous Emergency Braking it is important not only to consider to avoid hitting the bicyclist, but also to avoid hitting the front or rear wheel of the bicycle. This can be achieved by wheel detection according to the invention.

Preferably, the wheel detections can be used in combination with a pedestrian detector to classify the object as a bicyclist or bicycle, and to improve the tracking of the space occupied by the bicyclist. In this embodiment, the pedestrian detector forms the non-wheel part detector mentioned earlier.

Another preferred application of the invention is the detection and/or classification of crossing motor vehicles, in particular cars, motorcycles, trucks or buses, using a monocular or stereo imaging system. In this application, a wheel detector according to the invention is used advantageously in combination with general object segmentation, for example based on optical flow, to be able to classify the detected object as a motor vehicle. In this embodiment, the object segmenter forms the non-wheel part detector mentioned earlier.

The wheel detector preferably uses a circle or ellipse detection algorithm, since wheels appear as a circle or more generally as an ellipse when viewed in a vehicle crossing scenario (i.e., where the plane of the circle of the wheel is not normal to the viewing direction). In a preferred practical embodiment, the wheel detector uses a Hough Transform algorithm. However, other forms of wheel detectors are possible; for example, the wheel detection may be based on a wheel classifier. Generally, the wheel detection may preferably be based on, or include, any suitable combination of tire detection, rim detection, spokes detection, and/or hub detection of a vehicle wheel.

As described above, the invention is particularly useful in crossing scenarios. A crossing scenario is one where another vehicle crosses, or is about to cross the path of the ego vehicle, in particular under an angle between 30°, preferably 45°, and 90°, where the wheels of the other vehicle are visible as circles or ellipses.

One advantage of the invention is that it can be used to improve the position accuracy in particular in a monocular camera system, where distance estimation is a known weakness. Generally, a detected wheel can preferably be used in the position and/or distance estimation of the detected object. This is based on the finding that a wheel is generally a very good reference to where the vehicle is located on the ground plane, which will be explained in more detail below.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
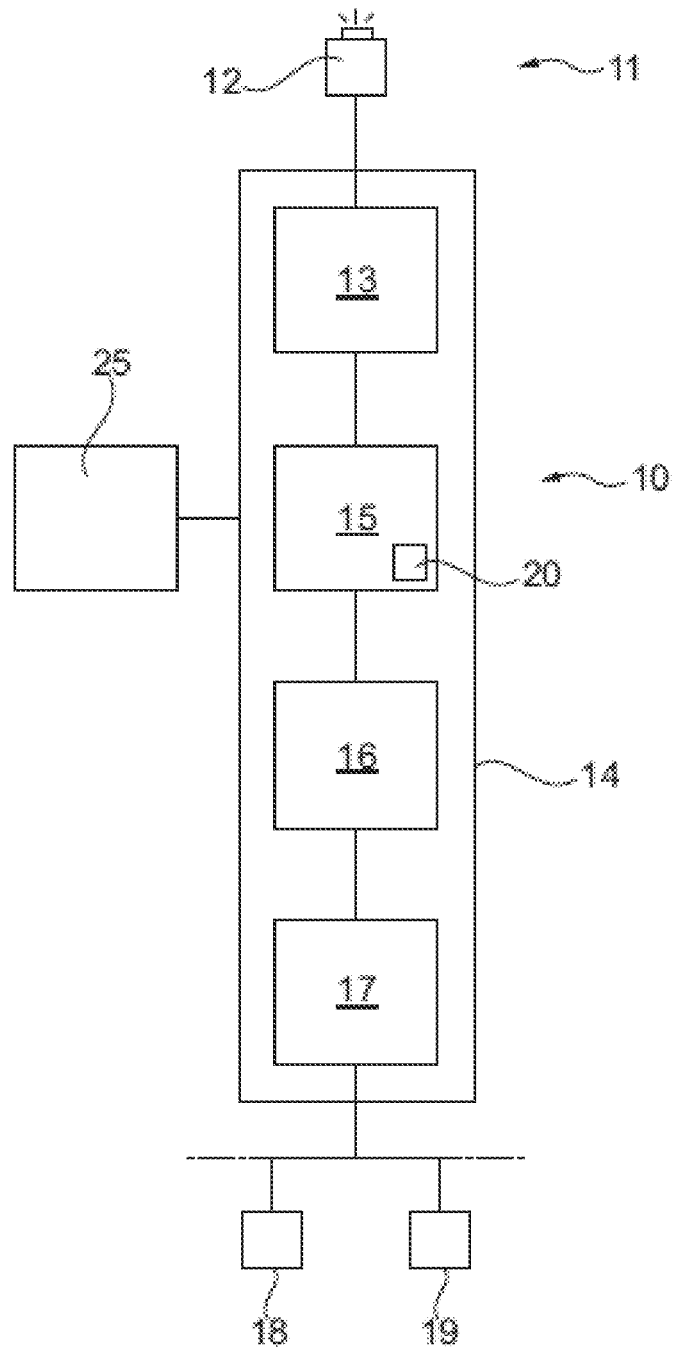
FIG. 1 shows a schematic drawing of a vision system according to the invention.

The vision system 10 is mounted in a motor vehicle and includes an imaging system 11 for acquiring images of a region surrounding the motor vehicle, for example a region in front of the motor vehicle. Preferably the imaging system 11 includes one or more optical imaging devices 12, in particular cameras, operating in the visible and/or infrared wavelength range, where infrared covers near IR with wavelengths below 5 microns and/or far IR with wavelengths beyond 5 microns. In some embodiments the imaging system 11 includes a plurality imaging devices 12 in particular forming a stereo imaging system 11. In other embodiments only one imaging device 12 forming a mono imaging system 11 is used, as shown for example in FIG. 1.

The imaging system 11 is coupled to a data processing device 14 where image and data processing of the image data received from the imaging 11 system is carried out.

The data processing device 14 may include a pre-processing section 13 adapted to control the capture of images by the imaging system 11, receive the electrical signal containing the image information from the imaging system 11, warp pairs of left/right images into alignment and/or create disparity images, which per se is known in the art. The image pre-processing section 13 may be realized by a dedicated hardware circuit, for example a Field Programmable Gate Array (FPGA). Alternatively the pre-processing section 13, or part of its functions, can be realized in a microprocessor. In the case of a vision system 10 using only one camera 12 the pre-processing section 13 may be omitted.

The processing means 14 includes an object detection section 15 adapted to identify and preferably also classify possible objects in front of the motor vehicle, such as pedestrians, other vehicles, bicyclists or large animals, a tracking section 16 adapted to track over time the position of object candidates in the recorded images identified by the object detection section 15, and an estimation and decision section 17 adapted to estimate a collision probability of a tracked object and to activate or control at least one driver assistance device 18, 19 depending on the estimated collision probability. The driver assistance device 18, 19 may in particular include a display device 18 to display information relating to a detected object. However, the invention is not limited to a display device. The driver assistance device 18, 19 may in addition or alternatively include a warning device adapted to provide a collision warning to the driver by suitable optical, acoustical and/or haptical warning signals; one or more restraint systems such as occupant airbags or safety belt tensioners, pedestrian airbags, hood lifters and the like; and/or dynamic vehicle control systems such as brake or steering control devices. The data processing device 14 expediently has access to a memory device 25.

The data processing device 14 is preferably a digital device which is programmed or programmable and expediently includes a microprocessor, micro-controller or a digital signal processor (DSP). The data processing device 14 and the memory device 25 are preferably realised in an on-board electronic control unit (ECU) and may be connected to the imaging system 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image pre-processing, image processing to possible activation or control of driver assistance device 18 are performed automatically and continuously during driving in real time.

The object detection section 15 of the data processing device 14 includes a wheel detector 20 which is adapted to detect and/or classify wheels or wheel-like structures in the images provided by the imaging system 11 through image processing. The wheel detector 20 preferably employs a Hough Transform algorithm to detect circular or elliptical structures of suited size in the images. Alternatively, for example the wheel detector 20 may be based on wheel classification. A combination of a wheel detection algorithm in particular based on a Hough transform and a subsequent wheel classification and/or verification step is also possible.

In the following, the usage and benefits of the inventive wheel detector 20 in the vision system 10 is explained by way of two examples shown in FIGS. 2A to 2C and 3.

Figure 2A:
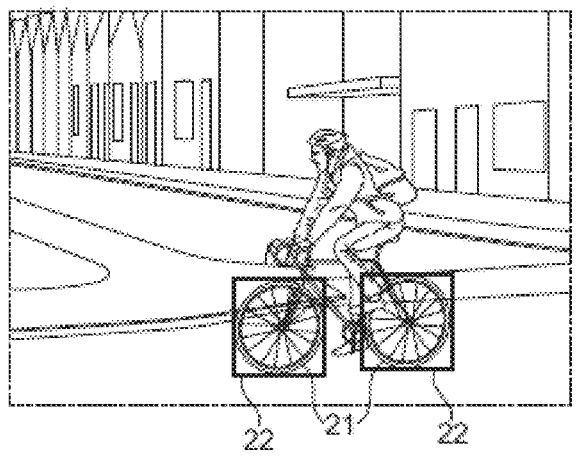
FIGS. 2A-2C show different images illustrating the usage of a wheel detector in the detection of a bicyclist.
Figure 2B:
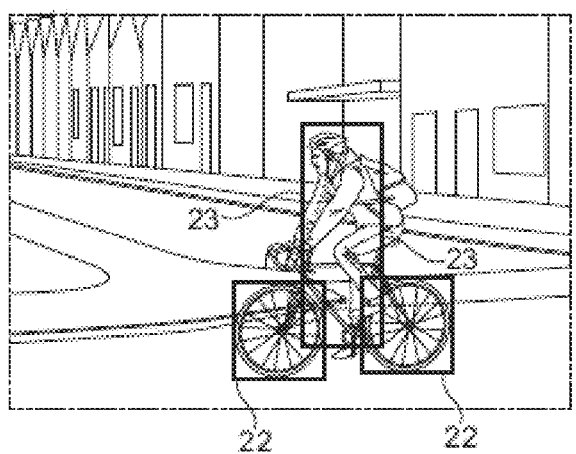
Figure 2C:
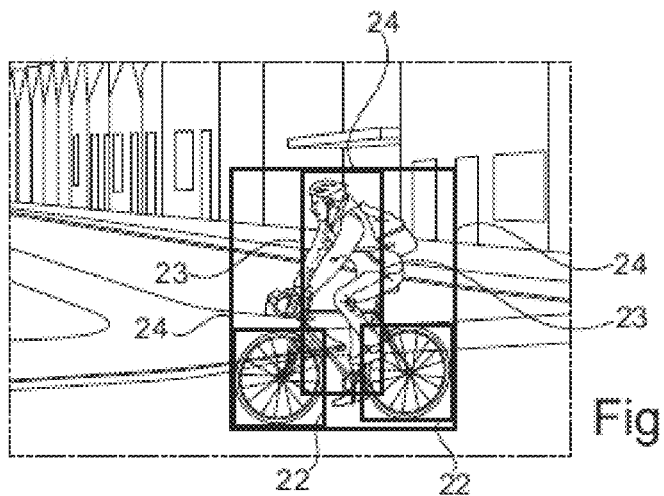

FIGS. 2A to 2C relate to bicycle detection and/or classification. Here, the wheel detector 20 is used to detect and/or classify the wheels 21 of a bicycle, as shown in FIG. 2A. The wheel detections/classifications are marked by rectangles 22 in FIGS. 2A to 2C.

The wheel detector 20 is preferably combined with a pedestrian detector in the object detection section 15, which is adapted to detect and/or classify persons in the images provided by the imaging system 11 through image processing. In particular, the pedestrian detector is adapted to detect not only pedestrians but also bicyclists. The detected/classified bicyclist is marked by a light rectangle 23 in FIGS. 2B and 2C.

The bicyclist detection shown in FIG. 2B may take place before or after the wheel detection shown in FIG. 2A. In particular, the search area for the wheel detector 20 can be grid-based covering the whole field of view, i.e. the whole image provided to the data processing device 14, possibly restricted by a determined ground plane and/or driving corridor. Alternatively, the search area for the wheel detector 20 may be limited to the neighborhood of a classified pedestrian and thus significantly smaller than the whole field of view. In the latter case, which may save significant processing resources, the wheel detection expediently takes place after the pedestrian or bicyclist detection. Alternatively, the search area of a bicyclist may be limited to the neighborhood of a wheel (possibly classified as a bicycle wheel) or a pair of (bicycle) wheels.

Finally, as shown in FIG. 2C by a large light square 24 encompassing the wheels 22 and the bicyclist 23, a bicyclist/bicycle object 24 is determined from a combined detection/classification of a pair of wheels 22 and a bicyclist 23 arranged at typical distances and positions relative to each other.

Figure 3:
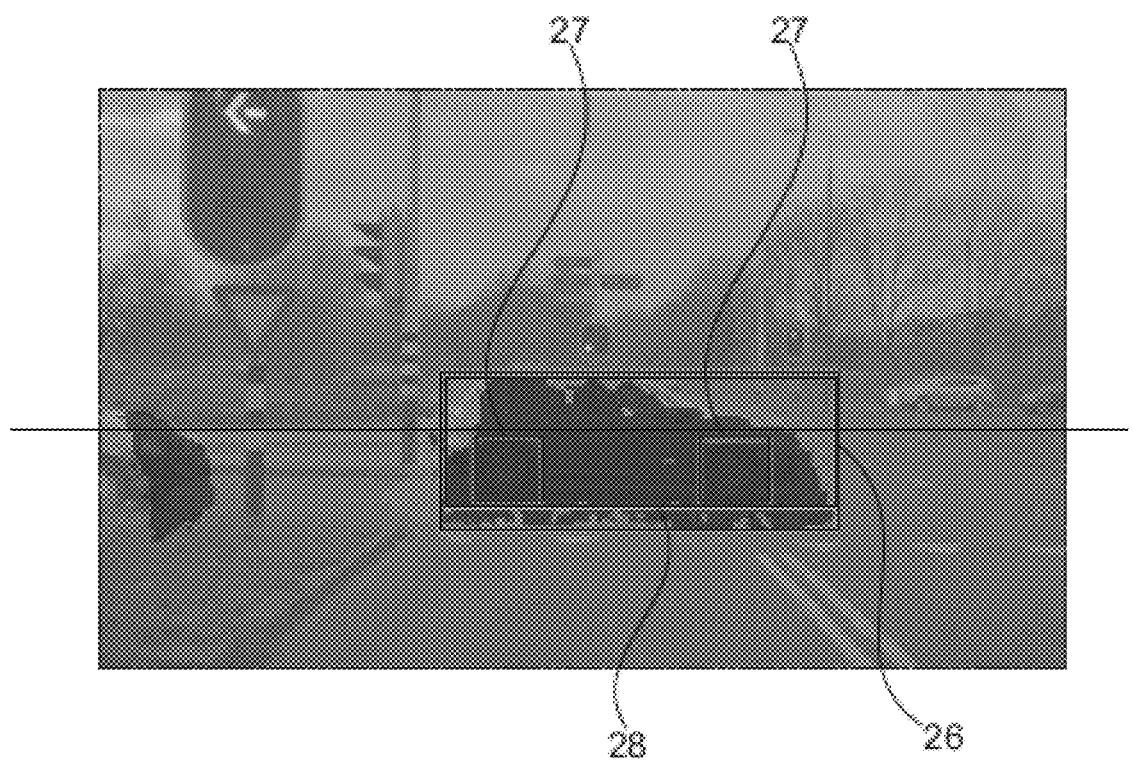
FIG. 3 shows an image illustrating the usage of a wheel detector in the detection of a crossing car.

FIG. 3 relates to another application of the invention, namely the detection and/or classification of a crossing motor vehicle, in particular a car, using a monocular or stereo imaging system 11. Here, the wheel detector 20 is used in combination with an object segmenter provided in the object detection section 15. The object segmenter is adapted to detect a segmented object (black rectangle 26 in FIG. 3), in particular based on optical flow. The segmented object 26 is combined with a pair of suitably arranged wheels 27, possibly classified as car wheels, in order to detect the crossing motor vehicle or car 28 (light square in FIG. 3). As a result, the wheel detector 20 is part of a crossing motor vehicle detector and/or classifier.

The invention can be used to improve the position accuracy in particular in a monocular camera system 11, where distance estimation is a known weakness. Generally, a detected wheel can preferably be used in the position and/or distance estimation of the detected object. This is based on the finding that a wheel is generally a very good reference to where the vehicle is located on the ground plane.

For example, the contact point to the ground can preferably be used to improve the distance estimation to a bicyclist 23, as compared to where the bicyclist is detected as a pedestrian, which then appears to be floating above ground, see FIG. 2.

Also in the detection of crossing motor vehicles like cars, the wheel detector 20 could provide improved distance information, since the wheel detector 20 provides a much better reference point to where the motor vehicle is located on the ground plane, as compared to object segmentation based for example on optical flow, see FIG. 3. Object segmentation based on optical flow can be distracted for example by the shadow of the car, making the contact point to the ground plane fuzzy and error-prone.

An additional cue to distance estimation is the size of the wheels 22, 27, which for bicycles and motor vehicles like cars are standardized and thus well known. Hence the scale of the wheel detection also contains valuable information which could be used to improve the estimated distance to the detected object.

While the above description constitutes the preferred embodiment of the present invention, it will be appreciated that the invention is susceptible to modification, variation and change without departing from the proper scope and fair meaning of the accompanying claims.

The invention claimed is:

1. A vision system for a motor vehicle, comprising, an imaging system adapted to capture images from a surrounding of the motor vehicle and a data processing device establishing an object detector adapted to detect an object in an image captured by the imaging system through image processing, the object detector comprises a wheel detector adapted to detect a wheel, a wheel-like structure, or a characteristic part thereof, of a other vehicle, wherein the other vehicle is a bicycle and the object detector detects the object as the bicycle from a combined detection of a pair of the wheels and a bicyclist arranged in a typical manner relative to each other, the bicyclist being detected using a pedestrian detector.

2. The vision system as claimed in claim 1, further comprising, the wheel detector is combined with a non-wheel detector adapted to detect a non-wheel part of the other vehicle.

3. The vision system as claimed in claim 2, further comprising, a search area for the wheel detector is limited to a neighborhood of a detected non-wheel.

4. The vision system as claimed in claim 1, further comprising, the wheel like object, or the characteristic part thereof is used in the position or distance estimation of the detected object.

5. The vision system as claimed in claim 1, further comprising, the wheel detector is used in combination with an object segmenter in particular based on optical flow.

6. The vision system as claimed in claim 1, further comprising, the wheel detector uses a circle or an ellipse detection algorithm.

7. The vision system as claimed in claim 1, further comprising, the wheel detector uses a Hough Transform algorithm.

8. The vision system as claimed in claim 1, further comprising, the wheel detector uses a wheel classifier.

9. The vision system as claimed in claim 1, further comprising, the wheel detector is adapted to detect at least one of a tire, a rim, one or more spokes, or hub of the wheel.

10. A vision method for a motor vehicle using a vision system as claimed in claim 1, to detect a crossing of the other vehicle relative to the motor vehicle.

11. The vision system as claimed in claim 2, further comprising, a search area for the wheel detector is limited to a neighborhood of a detected wheel.

12. The vision system as claimed in claim 1, further comprising, wherein the object detector upon detecting the object based upon detection of the wheel, the wheel like structure, or the characteristic part thereof identifies the object as the other vehicle.

* * * * *